Dec. 5, 1967 J. K. A. DAHLGREN ETAL 3,356,390
HOSE COUPLINGS, HOSE CONNECTIONS, ETC.,
PARTICULARLY FOR SUBMERSIBLE PUMPS
Filed May 13, 1965 4 Sheets-Sheet 2

United States Patent Office 3,356,390
Patented Dec. 5, 1967

3,356,390
HOSE COUPLINGS, HOSE CONNECTIONS, ETC.,
PARTICULARLY FOR SUBMERSIBLE PUMPS
Jens Karl Adolf Dahlgren, Stockholm, and Carl Evert
Sjöstrand, Bandhagen, Sweden, assignors to Aktiebolaget Flygts Pumpar, Solna, Sweden, a corporation of Sweden
Filed May 13, 1965, Ser. No. 455,565
Claims priority, application Sweden, June 15, 1964, 7,272/64
9 Claims. (Cl. 285—27)

ABSTRACT OF THE DISCLOSURE

A hose coupling having a pair of sections rotatable through an arc of 360° relative to each other, radially extending lugs of unequal arc length on one of the sections, radially extending vanes on the other section for engagement with lugs to permit dismantling the coupling in only one position of rotation, and a guide to prevent inadvertent rotation of the coupling sections to that position permitting dismantling.

The present invention relates to hose couplings, hose connections or the like for fluid, compressed air or other pressure media, which couplings etc. comprise two coupling sections. The coupling sections in such couplings generally comprise of two similar coupling halves provided with diametrically opposed coupling lugs around their circumference, which lugs pass into recesses situated in the opposing coupling half when the two halves are brought together for the purpose of combining the same, and which upon subsequent mutual rotation of said coupling halves in their common abutment plane—in a manner similar to that of a bayonet connection—are brought into engagement with coupling vanes arranged on said opposite coupling half. In the sealing surfaces of both the coupling halves, seals are found which are made of an elastic material, for example rubber, and which lie in abutment with each other. The coupling lugs thereby lie laterally against each other in pairs when the coupling halves are combined, so that the combining rotation movement is restricted.

Similar hose couplings are unmovably combined with their corresponding hose ends, and are rotated with the coupling rotation together with the hoses. The hoses, thus cannot be rotated in relation to each other after they have been connected.

In the type of hose couplings which are used to connect compressed air hoses belonging to a brake system in railway carriages, the abutment surface of the coupling halves does not lie in a plane at right angles to the longitudinal axis of the hoses but instead in a vertical plane, which thus requires the axial directions of the hoses to cross each other so that the coupling halves when connected, are brought together in a direction which is at right angles to both the longitudinal axes of the hoses. This type of coupling does not allow any mutual movement of the coupling halves either, since they are locked in a mutual coupling position.

The inability of the couplings described above to be moved in the connected position, has meant that the coupling principle in question has not gained large use in hose connections either, at least when applied to hose connections into the form of a fixed elbow pipe connections such as these are relevant for example during the construction of pump units, e.g. of the submersible type. In this case, in known hose connections, one has therefore been obliged to fix the hose connection elbow at the outtake opening of the unit with the assistance of a flange-forming clamp, which together with an inter-posing rubber seal is, by means of screws, fastened to a plane connecting edge around an out-take opening of a unit. The assembling and dismantling of such a hose connection, thus requires a number of securing screws to be loosened, and thereafter the hose connection, together with the hose which is fixed to the same, by means of, for example, a strip clamp, is removed. This assembling and dismantling thus requires the use of tools and is difficult to carry out under practical working conditions, as for example in excavating and building sites with the whole of the hose hanging from the hose connection.

Another inconvenience with such hose connections is also that the direction of the hose cannot be changed but instead the hose connection must be loosened necessitating the use of tools causing so much inconvenience that one generally avoids such engagements during working operations, and thus a fold in the hosing appears causing considerable throttle loss.

When, for instance, pumps are moved relatively short distances the assembly method in question generally means that the pump is transported between the erection sites with a hose securely assembled to the pump, which is both difficult and time wasting.

The present invention intends to avoid the above mentioned inconveniences with hose couplings and hose connections or the like intended for fluid, compressed air or other pressure media, which couplings etc. comprise two connection sections, where the one is provided around its circumference with at least two opposing connecting lugs, whilst the other is provided with connecting vanes intended for engagement with said lugs when the coupling sections are joined together; said vanes, upon bringing the two coupling sections into engagement with each other, fit into recesses between said lugs and upon subsequent mutual rotation of the coupling sections in their common abutment plane, are brought into engagement in a manner similar to that of a bayonet connection; and is mainly characterized thereby, that at least one lug in the one coupling section extends over a greater part of the circumference of the coupling than the other lug or lugs, in such a way what the coupling sections, after they have been joined together, can be rotated in all mutual angle positions except one without it being possible to separate the coupling. The lugs sections of the one coupling section are thereby suitably formed by an inwardly directed flange and the vane sections of the other coupling section, of an outwardly directed flange.

According to one embodiment of the invention, the one coupling section is thereby provided with an axially extending guide track which cooperates with a guide member on the other coupling section in such a way that both the sections can be mutually guided in order to adapt said one angle position in which the coupling sections can be put together or taken apart. It is thereby convenient to design said guide member so that it is easily movable out of said track, for example by causing it to be actuated by a spring.

According to a further development of the invention the one coupling section is provided with a sealing ring formed as a sealing cuff of elastic material and provided with a lipped edge, for example of rubber or plastic, which is brought into abutment with a suitable cylindrical sealing surface on the opposing coupling section when the coupling sections are brought together, and during operation is pressed tightly against said sealing surface with its lip forming section, by the pressure from the advanced pressure medium.

One very advantageous characteristic of the invention is also that the above mentioned guide track is arranged on a shoulder-forming raised portion on the periphery of the one coupling section, and that the track is suitably relatively shallow so that the guide member, when the coupling sections are mutually rotated subsequent to the assembly of said coupling sections, either slides up on one or the other flanks of the coupling shoulder, and upon further mutual rotation of the coupling sections, along a steep side edge of a coupling shoulder, falls down against the circumference surface of the one coupling section and thereby mutually locks the coupling sections in such a way that, although mutually movable through an angle corresponding to the larger section of the circumference, they cannot, however, be brought into a mutual position which admits both the coupling sections to be released from each other unless a spring actuated guide member is returned up the coupling shoulder and down into the guide track.

According to another embodiment of the invention, the one coupling section is constituted by a flange forming clamp secured by special securing members, for example screws, in an aggregate driving the pumped medium, or a container containing this medium, said clamp being provided with coupling lugs, whilst the other coupling section is constituted by a hose connection in the form of an angularly bent pipe, the connection flange of which is provided with coupling vanes which fit into recesses between the coupling lugs of the clamp, whereby said hose connection, in the proximity of said flange, is suitably provided with a coupling shoulder of the type described above, It is also advantageous to provide the above mentioned spring, which actuates the guide member, with a simple thumb grip so that the hose coupling or hose connection, by means of a simple movement of the hand, can be brought to a dismantling position.

The above mentioned sealing ring is advantageously fixed in a groove in the one coupling section and its lip forming part is thereby suitably manufactured in the form of a sealing cuff section extending in the other coupling section.

The invention will now be further described in connection with the attached drawings, which show the following:

FIG. 1 an embodiment of the invention in the form of a hose connection intended for a submersible pump.

Figure 1:
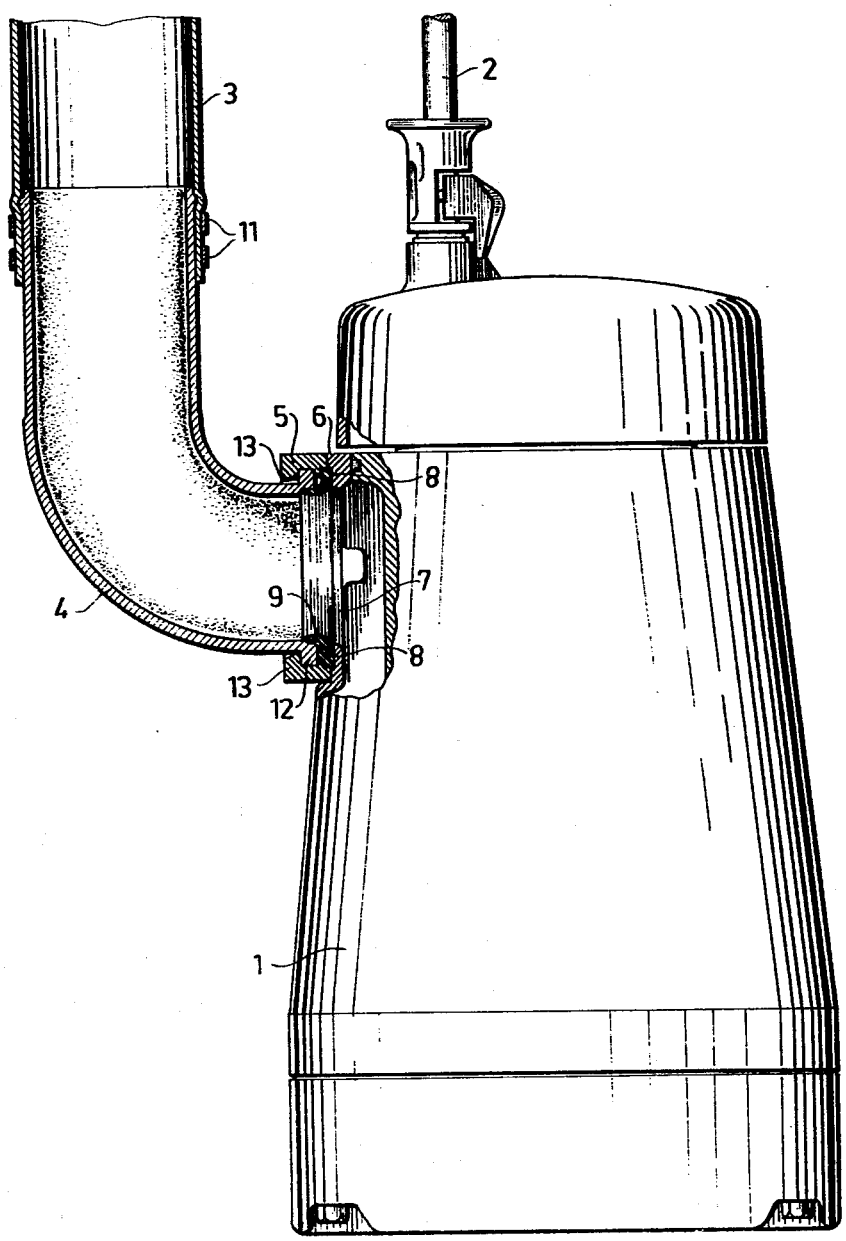

The reference numeral 1 in FIG. 1 indicates a so called submersible pump assembled as a unit, the supply cable of which to the electrical motor is indicated by the reference numeral 2, and the outlet hose of which is indicated by 3. Between the pump unit 1 and the hose 3 is arranged a hose connection comprising an elbow pipe 4 and a clamp 5 which is securely bolted to a plane annular surface 6 around the outlet opening 7 of the pump unit. On the annular track in the clamp 5 is arranged a cuff forming sealing ring 8 which, by means of a lip forming section 9, is passed in against a substantially cylindrical sealing surface 10 to the inside of the pipe elbow 4 which forms the one coupling section. On the opposite end of the elbow pipe the hose 3 is fitted and secured with the assistance of a pair of strip clamps 11. Vanes 12, arranged on a flange ring on the elbow pipe, are in engagement with lugs 13 on the clamp in a way which will be more closely described in connection with FIGURES 2, 3 and 4. By means of distance ribs 14, arranged on the surface of a sealing ring which is turned towards the pipe flange, it is possible that said flange surface, and thus also the elbow pipe, can be rotated in relation to the sealing ring without causing damage to the same. Due to the fact that the elbow pipe can be rotated in relation to the clamp, it is possible to adjust the elbow pipe in the best way according to the position of the hose, so that when pumping fluid through the hose, a throttle loss is avoided. A certain restricted yielding in the plane of the elbow pipe is also given by a flange on the pipe connection, resting against a sealing ring.

Figure 2:
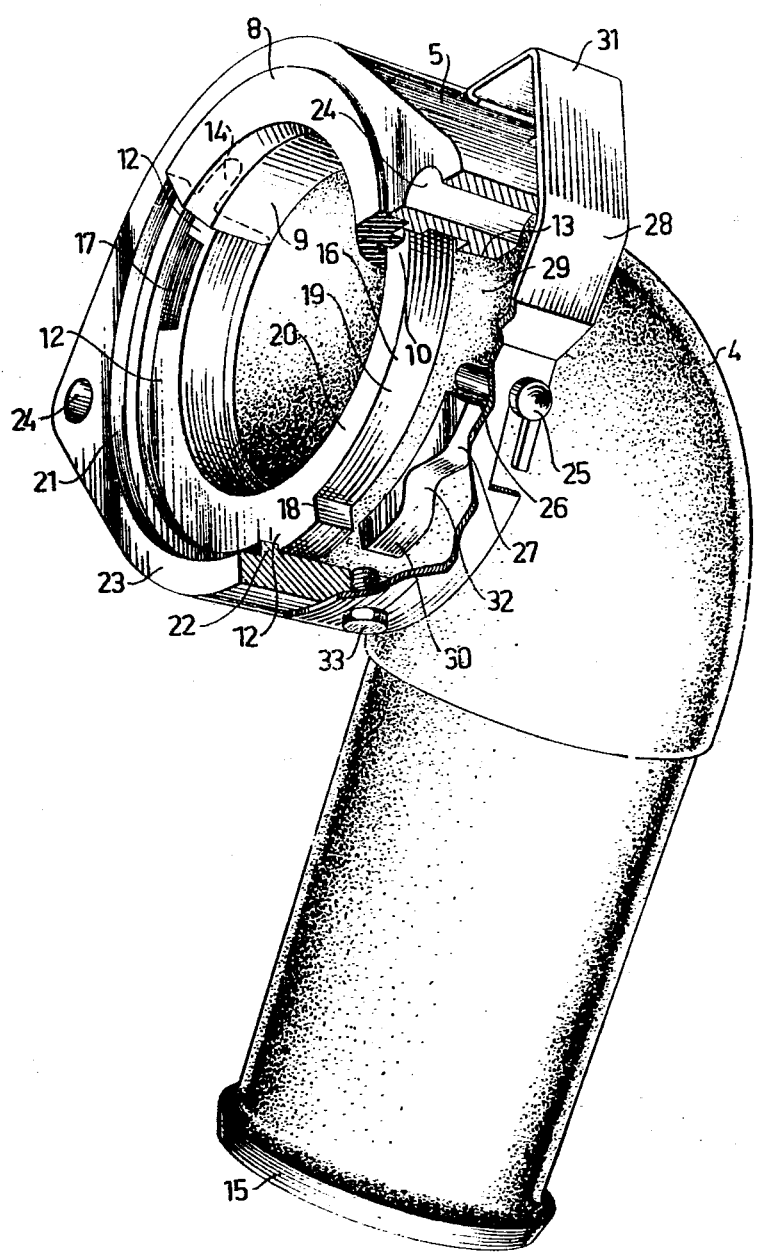
FIG. 2 is a perspective view of the hose connected together with its clamp in an assembled position.

In FIG. 2 a hose connection is shown with the end 15 of the elbow pipe, intended for joining the hose, turned downwards. The elbow pipe is provided with a flange ring 16 at its opposite end, said flange ring 16 having coupling vanes 12 which are unequally distributed around the circumference so that the recesses 17 between one pair of facing end edges of the vanes are smaller than the recesses between the opposite facing end edge pairs 18 of the vanes. The last mentioned recesses can only partly be seen in FIG. 2, and are turned towards the viewer. They have been given the reference numeral 19 in FIG. 2 only a portion of the cuff forming sealing ring 8 is shown. Its ribs 14, which rest against the flange surface 20, can also be seen in the figure. The lip forming section 9 of the sealing ring abuts the cylindrical inner sealing surface 10 on the flange section of the elbow pipe. A sealing ring is arranged in a groove 21 in a clamp 5 which is formed between an annular flange 22 on the inside of said clamp, and a plane annular surface 6 around the outlet opening of the pump unit against which surface the surface 23 of the clamp is intended to abut when the clamp, with the assistance of bolts passed through the holes 24, is secured to the pump housing. The coupling vane 12 furthest away, which can be seen only partly under the sealing ring 8 together with the other coupling vane 12 holds the elbow pipe 4 in the clamp 5, in the position shown in FIG. 2, with the assistance of the coupling lugs 13, of which only a through section of one is visible in FIG. 2.

In the position shown in FIG. 2 a guide member 25 is passed in a locking position into the one side edge 26 of a combined guiding and locking shoulder 27. When said guide member 25 is brought into this position, it is retained in said position by means of pressure exerted by a spring 28. It is then possible to rotate the elbow pipe 4 in relation to the clamp 5, so that the guide member slides along the outer surface 29 of the elbow pipe 4 until the shoulder 27, during the rotation of its other edge 30, comes to lie in abutment with a guide member 25, from the other side. In this way a rotation of the elbow pipe 4, forming the one coupling section, in relation to the clamp 5, forming the other coupling section, of approximately 300° is possible. The only feature limiting the mutual movement is the extension, required for constructional technique reasons, of the combined locking and guiding shoulder 27 along the periphery of the elbow pipe. If it is required to release both the coupling sections from each other, the guiding and locking member 25 is lifted by means of the spring 28, by pressing a surface 31 of a spring up onto the shoulder 27, with the assistance of a simple movement of the hand, whereafter the elbow pipe 4 can be further rotated until the member 25 sinks down into the guide track 32. Since the spring 28 is fixed to the clamp 5 by means of bolts 33 in such a way that the guide member 25 thereby holds the shoulder 27, and thus the elbow pipe 4 in such a position in relation to the clamp 5, that the recesses 17 and 19 in this position lie opposite the coupling lugs 13 and 34 on the clamp 5, both the coupling sections, the elbow pipe 4 and the clamp 5 can be dismantled.

Figure 3:
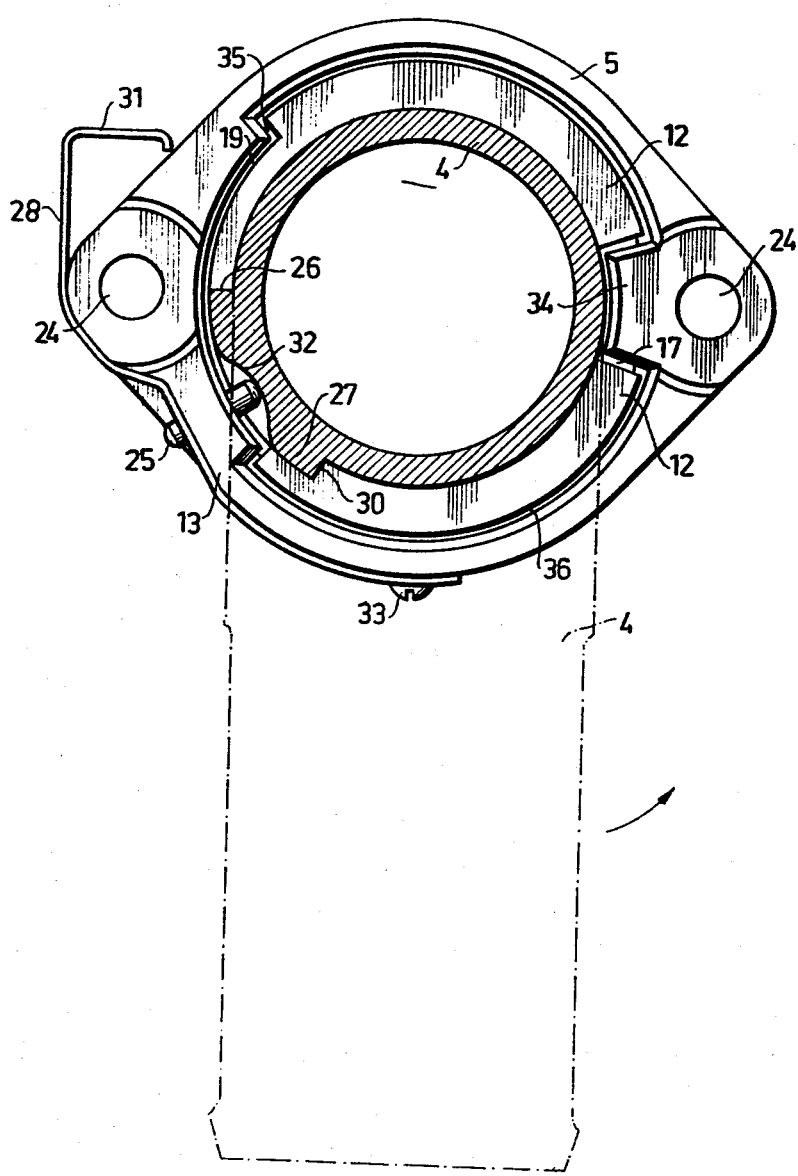
FIG. 3 is a vertical projection of the hose connection and the clamp seen towards the outlet opening, whereby the hose connection has the correct position for inserting the clamp.
Figure 4:
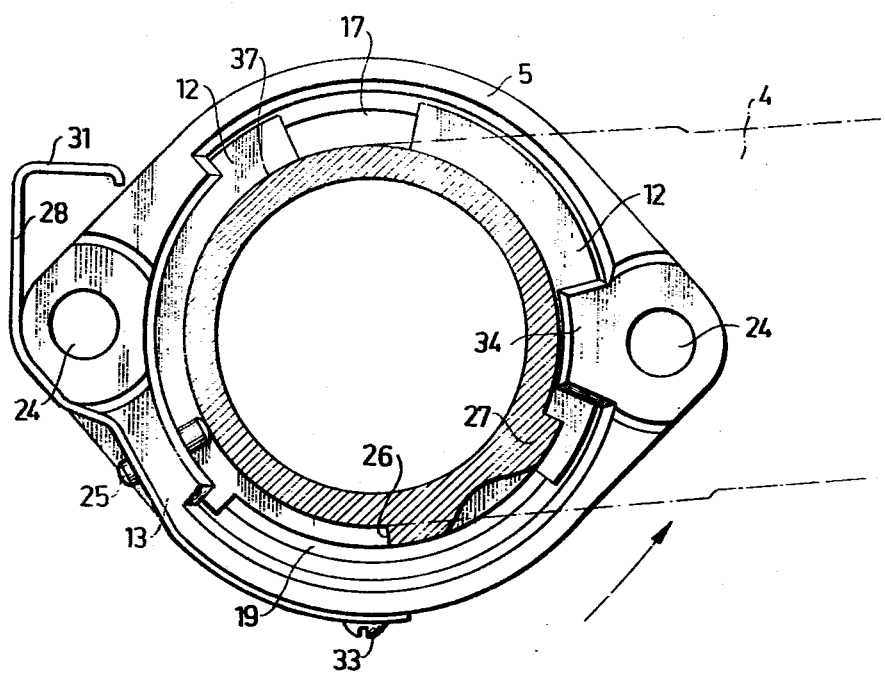
FIG. 4 shows a hose connection seen from the same side as in FIG. 3 but with a hose connection pipe rotated in relation to the clamp.

The construction and extension of the coupling vanes 12 and the coupling lugs 13 and 34 around the circumference of the coupling sections can be more clearly seen from FIGURES 3 and 4. In this figure a section of the elbow pipe 4 which lies nearest a flange ring 16 is only shown in section, whilst the remainder of the elbow pipe 4 is dotted. A clamp 5 is shown viewed from the front towards the outlet opening of the pump unit. The same designations have been used in FIGURES 3 and 4 as were used in FIGURES 1 and 2 for corresponding portions.

In FIGURE 3, the coupling section formed by the elbow pipe 4 is shown in the inserting position. The guide member 25 thus lies in the guide track 32 of the shoulder 27. In this position, the coupling vanes 12 of the coupling sections formed by the elbow pipe 4 fit into the recesses 35 and 36 of the clamp 5, whilst the lugs 13 and 34 of the clamp, fit into the recesses 17 and 19 between the coupling vanes 12 on the flange section of the elbow pipe 4. As can be clearly seen from FIGURE 3, the distance between the securing screw of the spring 28 in the clamp 5 and the guide member 25 is such that the above described centering between both coupling sections 4 and 5 is obtained. Thus in this position the coupling section can be passed into the clamp 5 or withdrawn out of the same. However, as soon as the one coupling section 4 (the elbow pipe) is rotated in relation to the other coupling section 5 (the clamp), the coupling vanes 12 slide in under the coupling lugs 13 and 34 and the assembly of the two sections thereby commences. At the same time the guide member slides up the right or left side section of the shoulder 27 and, upon continued rotation of both coupling sections in relation to each other, the member 25 falls down past the edge 26 or 30 on the shoulder 20, in against the periphery of the elbow pipe 4. Both the coupling sections are thereby connected together and mutually locked insomuch that they cannot be separated unless the combined guide and locking member 25 is lifted, with the help of spring 28, into the guide track 32. In contradistinction thereto a mutual rotation of both coupling sections by sliding the member 25 around the outer surface of the elbow pipe is not prevented.

In FIGURE 4 both sections are shown in a mutual assembled and locked position, whereby it has been assumed that the locking member 25 has been pushed down by the edge 26 of the shoulder 27 during the rotation of the elbow 4, away from the position shown in FIGURE 3, in the direction of the arrow, counterclockwise, to the position shown in FIGURE 4. As can be seen, the locking member 25 thereby slides on the surface 37 of the elbow pipe, and the vanes 12 have passed in under the coupling lugs 13 and 34, whereas the recesses 17 and 19 between the vanes lie between said coupling lugs. The screws, intended for securing the clamp 5 to the pump housing, which are to be passed through the holes 24, are not shown in diagrams 3 and 4.

As is evident from the above, the described connection can also be made as a coupling. The only feature of importance is that one coupling section is provided with unequally arranged lugs, and that the flange of the other section has corresponding recesses, so that coupling vanes according to the invention are formed. In this way a mutual freedom of movement is obtained between both coupling sections, which is only restricted by a special lock which prevents both coupling sections from involuntarily adopting the one position where they could be taken apart. By means of a cuff-like sealing ring, which upon movement between both sections slides against a sealing surface, a further sealing of the coupling is attained. Thus in this way it is possible to mutually rotate the coupling halves through approx. 300° whilst retaining a sealing effect. All that is required for the assembling and dismantling of the coupling is a simple movement of the hand—no tools being required. During the passage of the pressure medium, the lipforming edge of the cuff-like sealing ring is pressed harder against a sealing surface on the sealing surface of the opposite coupling section, the greater the pressure that prevails—thus sealing effectively against leakage.

Although the invention is described in connection to an embodiment of the same, it can, however, be varied in any way within the scope of the following claims.

What we claim is:
1. A hose couping comprising: a pair of joinable tubular sections, which sections upon being joined are rotatable relative to each other from a first position, said coupling permitting axial fluid flow through said section at any position of rotation; a plurality of opposed lugs mounted on the circumference of one of said sections, at least one of said lugs extending across a longer arc length of said circumference than any other of said lugs; a plurality of vanes mounted on the other of said sections, said vanes fitting between and complementary in size to said lugs to allow said sections to be joined together when said sections are in said first position, said vanes engaging said lugs upon rotating said sections from said first position; interengageable guide means on said sections for releasably holding said sections in said first position; and rotation limiting means on said sections operative to engage one of said guide means to prevent said sections from being returned to said first position after said sections have been rotated therefrom; said one guide means being selectively disengageable from said rotation limiting means to allow said sections to be rotated to said first position whereby said sections may be separated.

2. A hose coupling as defined in claim 1 wherein said lugs form part of an inwardly directed flange on said one section; and said vanes form part of an outwardly directed flange on said other section.

3. A hose coupling as defined in claim 1 wherein said interengageable guide means include an axially aligned track on one of said sections and a follower on the other of said sections, said follower being positioned in said track when said sections are in said first position.

4. A hose coupling as defined in claim 3 wherein said follower in held in the track by a spring having a thumb grip for releasing the follower.

5. A hose connection as defined in claim 3 wherein said follower is a pin and is resiliently held in said track by a spring.

6. A hose coupling as defined in claim 5 wherein said rotation limiting means include a pair of circumferentially spaced, radially extending walls on one of said interengageable guide means, said track is a gradually sloping recess between said walls, whereby said follower may slide up the recess upon rotation of said sections away from said first position, but is prevented by said radially extending walls from returning to said track, and means are provided to selectively prevent said walls from interfering with the return of said pin to said track.

7. A hose coupling as defined in claim 1 further comprising a cylindrical sealing surface on one of said sections; a cuff forming a sealing ring of elastic material on the other of said sections and adapted to abut said sealing surface when the sections are joined, said sealing ring having a lip forming edge adapted to press the ring tightly against the sealing surface by fluid pressure in the coupling.

8. A hose coupling as defined in claim 7 wherein said sealing ring is mounted in a groove in said other section.

9. A hose coupling as defined in claim 7 wherein said sealing ring has distance ribs on one surface to reduce friction and facilitate rotation of the coupling without folding the ring.

References Cited

UNITED STATES PATENTS

| | | | |
|---|---|---|---|
| 544,469 | 8/1895 | Shepherd | 285—377 X |
| 912,233 | 2/1909 | Dismuth | 285—376 X |
| 2,614,866 | 10/1952 | Ulrich | 285—376 X |
| 2,919,146 | 12/1959 | Gill | 285—401 X |

CARL W. TOMLIN, *Primary Examiner.*

R. G. BERKLEY, *Assistant Examiner.*